United States Patent
Dempsey et al.

(10) Patent No.: US 6,169,726 B1
(45) Date of Patent: Jan. 2, 2001

(54) METHOD AND APPARATUS FOR ERROR FREE SWITCHING IN A REDUNDANT DUPLEX COMMUNICATION CARRIER SYSTEM

(75) Inventors: Peter A. Dempsey; Clifford B. Stern; Gordon D. Woods, all of Morris, NJ (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/213,930

(22) Filed: Dec. 17, 1998

(51) Int. Cl.$^7$ .................................................. G01R 31/08
(52) U.S. Cl. .............................. 370/219; 370/282; 714/11
(58) Field of Search ................................... 370/216, 217, 370/218, 219, 220, 225, 228, 282, 283, 378; 714/10, 11

(56) References Cited

U.S. PATENT DOCUMENTS

| | | | |
|---|---|---|---|
| 5,408,462 | * | 4/1995 | Opoczynsi ........................... 370/282 |
| 5,434,998 | * | 7/1995 | Akai et al. ........................... 370/378 |
| 5,487,149 | * | 1/1996 | Sung .................................. 370/220 |
| 5,491,787 | * | 2/1996 | Hashemi ............................. 370/220 |
| 5,544,077 | * | 8/1996 | Hershey .............................. 370/282 |
| 5,652,833 | * | 7/1997 | Takizawa et al. ................... 370/217 |
| 5,663,949 | * | 9/1997 | Ishibashi et al. .................... 370/217 |
| 5,774,642 | * | 6/1998 | Flon et al. .......................... 370/220 |
| 5,983,360 | * | 11/1999 | Ugajin .................................. 714/11 |

* cited by examiner

*Primary Examiner*—Melvin Marcelo
*Assistant Examiner*—Phuongchau Ba Nguyen
(74) *Attorney, Agent, or Firm*—Dickstein Shapiro Morin & Oshinsky, LLP

(57) ABSTRACT

A method and apparatus for switching from an active to a standby controller in a redundant duplex carrier system without requiring retransmission of messages in progress during the switch. A main processor in the standby controller is periodically switched and made the active controller to ensure reliability of the system. The main processor in the active controller stops sending messages for a period of time before switching control to the standby controller. The main processor in the standby controller delays initiating any new communications until any current messages have been completed from the active controller. The main processor of the standby controller then retrieves any unprocessed messages that may have been sent to the active controller just before or during the switch from the active controller to the standby controller. The delay of new messages and retrieval of any unprocessed messages ensures that no data will be lost during the switch, thus removing the need for retransmission.

29 Claims, 2 Drawing Sheets

METHOD AND APPARATUS FOR ERROR FREE SWITCHING IN A REDUNDANT DUPLEX COMMUNICATION CARRIER SYSTEM

BACKGROUND OF THE INVENTION

1. Field of the Invention

The present invention relates generally to communications systems, and more particularly to a network access redundant duplex system and method for providing switching between an active controller and a standby controller without the need for retransmission of messages in progress.

2. Description of the Related Art

Conventional network access products, such as a digital network access telephone system, typically comprise at least one central switch which is capable of handling many simultaneous communications, such as telephone calls. The central switch typically is connected to a number of interface units, each of which provides access to the telephone system for one or more subscribers. A switch controller is provided to control the switching and routing of the telephone calls from one subscriber to another through the network.

As the telephone and other types of communication links which require access to a network have become more and more indispensable in every day life and the costs reduced to make such services possible for all, the number of subscribers to the network access systems has increased. As the number of subscribers increases, so to must the number of subscribers allotted to each interface unit or the number of interface units allotted to each switch increase to provide the necessary service access. Typically, each switch is capable of handling up to twenty-four access interface units, with each access interface unit capable of handling several subscribers. Correspondingly, each central switch must be able to handle the routing and switching of ever increasing numbers of communication paths. Thus, if the control unit of the switch fails, the resulting loss of service may not affect only a few subscribers but may affect numerous subscribers.

To prevent the loss of service to the numerous subscribers connected through a specific central switch should the controller in that switch malfunction, network access service providers have been utilizing redundant duplex carrier systems. In a redundant duplex carrier system, a pair of controllers are provided within each central switch. The first controller, initially designated as the active controller, provides the necessary switching and routing of the communications during normal operation. A second controller, designated as the standby controller, is provided within the system. To maintain a high degree of reliability, control of the system is periodically "soft switched," i.e., switched not under a failure condition, between the two controllers. A switch made under a failure condition is referred to a "hard switch." Statistically, if the system waits until the first controller fails before switching control to the second controller, there is a fifty percent chance that the second controller will have also failed during the same time period, thus leaving both controllers inoperative. To avoid the disruption of service caused by both controllers being inoperative, the system is "soft switched" frequently relative to the life of a controller so there is a good chance of detecting that one of the controllers is inoperative and repairing or replacing it before both controllers become inoperative at the same time.

There are problems, however, associated with the conventional switching of control from an active controller to a standby controller. The periodic switching from the active to standby controller is most difficult because it may occur frequently, such as for example, once every twenty-four hours, and must be done without disrupting operation. For example, it is possible that during the change from the active controller to the standby controller a data message may be in the progress of being sent from an interface unit to the switch. Should the control of the switch be changed from the active controller to the standby controller during this data message, there is a high probability that the message may be lost during transmission. One common approach to solve these problems is to send messages to both the active and standby controllers. This, however, has its own problems including the possibility of acting twice on the same message. While there are standard ways of dealing with the problem, that too adds to the cost and complexity of the system.

To prevent the possible loss of a message, conventional systems will re-send messages that were in progress during a switch from the active controller to the standby controller, resulting in additional delays for receipt of the message and corresponding delays to the subscriber.

Thus, there exists a need for an apparatus and method that will allow the switching of control from an active controller to a standby controller without the need for retransmission of messages or the risk of loss of data in the messages that may have been in progress during the change.

SUMMARY OF THE INVENTION

The present invention overcomes the problems associated with the prior art and provides a unique method and apparatus for switching between an active controller and a standby controller in a redundant duplex system without the need for retransmission of messages or the risk of loss of data in the messages that may have been in progress during the switching.

In accordance with the present invention, when a change between the active controller and standby controller is required, active controller will stop sending messages to the interface units. After a specified period of time, the main processor in the active controller stops running and signals a main processor in the standby controller to become active. The main processor in the standby controller waits for a fixed period of time before initiating any communications, thus ensuring that the sending of any current messages between the interface units and the switch have been completed before the switch from the active to standby controller is completed. In this manner, there will be no loss of messages and no need for the retransmission of messages which were in progress during the switch between controllers.

These and other advantages and features of the invention will become apparent from the following detailed description of the invention which is provided in connection with the accompanying drawings.

DETAILED DESCRIPTION OF THE PREFERRED EMBODIMENTS

The present invention will be described as set forth in the preferred embodiment illustrated in FIGS. 1–2. Other embodiments may be utilized and structural, logical or programming changes may be made without departing from the spirit or scope of the present invention.

Figure 1:
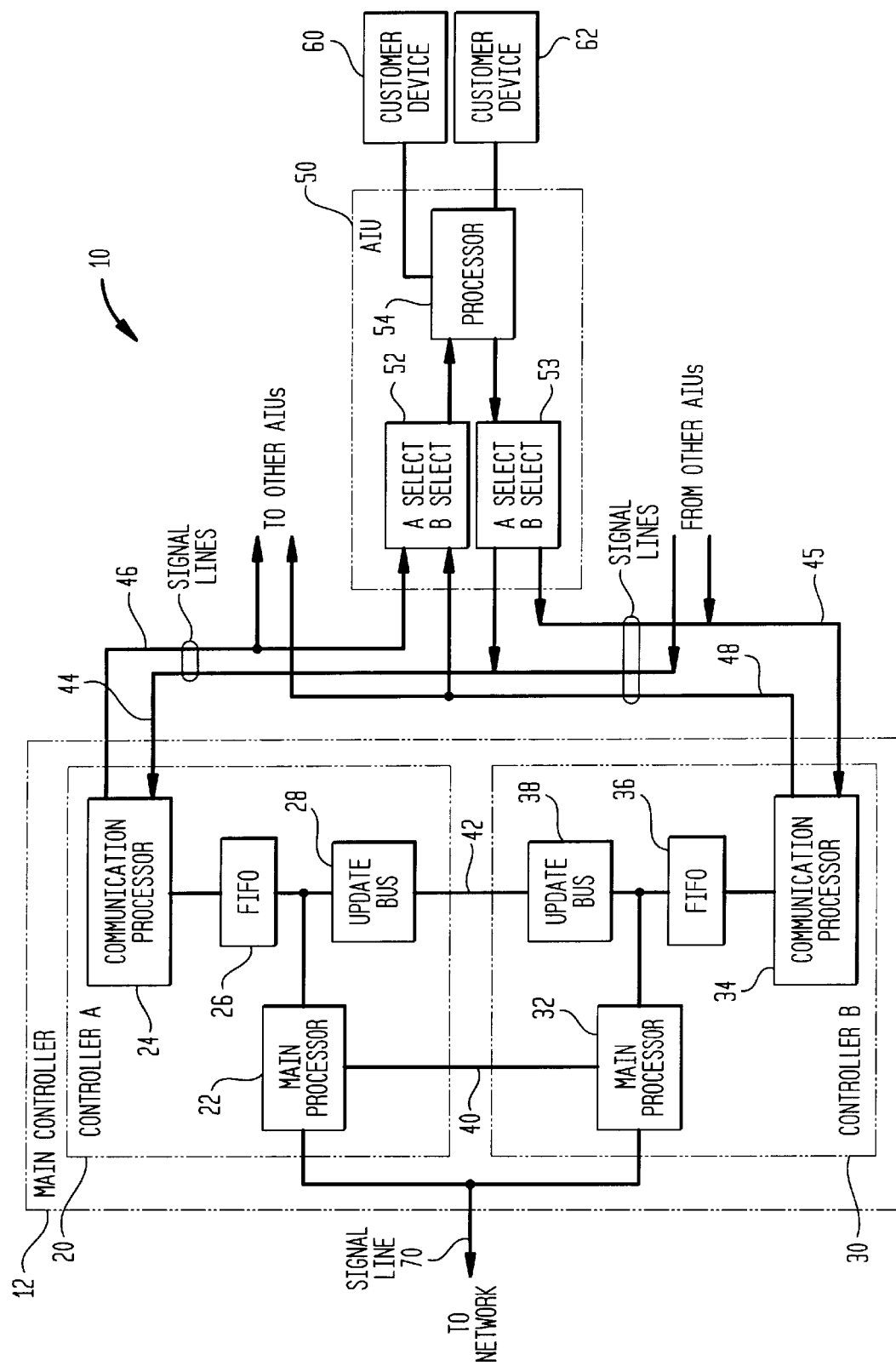
FIG. 1 illustrates in block diagram form a portion of a redundant duplex carrier system in accordance with the present invention.

FIG. 1 illustrates in block diagram form a portion of a redundant duplex system 10 capable of providing network access in accordance with the present invention. System 10 includes a main controller 12. Main controller 12 includes two controllers, controller A 20 and controller B 30. Controller A 20 includes a main processor 22, a communication processor 24, a first in, first out (FIFO) storage buffer 26, and an update bus 28. Controller B 30 includes a main processor 32, a communication processor 34, a first in, first out (FIFO) storage buffer 36, and an update bus 38. Main processor 22 is connected to and communicates with main processor 32 via conductor 40. Update bus 28 is connected to and communicates with update bus 38 via conductor 42.

The system 10 further includes an access interface unit (AIU) 50. Although only one such AIU 50 is illustrated, up to twenty four can be provided for each pair of controllers 20, 30. AIU 50 includes a processor 54 and two Select circuits 52, 53 for selecting between controller A 20 and controller B 30. Communication processor 24 of controller A 20 inputs signals to Select circuit 52 of AIU 50 via conductor 46. Communication processor 34 of controller B 30 inputs signals to Select circuit 52 of AIU 50 via conductor 48. Communication processor 24 receives signals from Select circuit 53 of AIU 50 via conductor 44. Communication processor 34 receives signals from Select circuit 53 of AIU 50 via conductor 45. Select circuit 52 and Select circuit 53 are further connected to processor 54 of AIU 50. Processors 22, 24, 32, 34 and 54 may be any general purpose single- or multi-chip microprocessor or any special purpose microprocessor. AIU 50 provides individual customer service features such as a telephone device 60, 62. While only two customer devices 60, 62 are illustrated, the invention is not so limited.

Controller A 20 and controller B 30 operate as a redundant active/standby pair. When a controller is active, its main processor is running; when a controller is in standby, its main processor is not running. Thus, for example, when controller A 20 is active and controller B 30 is in standby, main processor 22 is running and main processor 32 is not running. Conversely, if controller B 30 is active and controller A 20 is in standby, main processor 32 is running and main processor 22 is not running. Communication processors 24, 34 are always running, regardless of whether or not controller A 20 or controller B 30 is active.

In accordance with the present invention, the system 10 can switch between controller A 20 and controller B 30 without losing any messages between main controller 12 and AIU 50. For example, suppose initially that controller A 20 is selected as active, thus controller B 30 is in standby. This initial selection is input to the processor 54 of each AIU 50 in the system 10. Thus, main processor 22 of controller A 20 is running and main processor 32 of controller B 30 is not running. Both communication processor 24 and communication processor 34 are running.

Since controller A 20 is active, it is responsible for controlling the system to provide the necessary routing and switching of data messages to and from AIU 50. Thus, main controller 12 communicates with AIU 50 via controller A 20 in the following manner. A message may be received from a network via conductor 70 and input to main processor 22 and main processor 32. Since main processor 32 is not running, the message is not read or processed. Main processor 22, which is running, places the message in buffer 26. Communication processor 24 reads the message from buffer 26 and sends the message to Select circuit 52 of AIU 50. Processor 54 of MIU 50 selects the communication processor 24 or selects the messages from controller A 20 via conductor 46, since the information as to the initial active controller was previously input, and reads the message from communication processor 24 of controller A 20. Processor 54 of MIU 50 can then process the message and respond accordingly.

Similarly, AIU 50 communicates back to main controller 12 in the following manner. AIU 50 sends a message to communication processor 24 of controller A 20 via conductor 44. Communication processor 24 inputs the message to buffer 26. Since main processor 22 is running, it retrieves and reads the message from buffer 26. The message can then be processed and output from main processor 22 to a network via conductor 70.

If a switch is to be made to make controller B 30 become active in place of controller A 20, the system 10 operates in the following manner in accordance with the present invention. Main processor 22 of controller A 20 will stop sending messages to MeU 50. After a predetermined period of time, main processor 22 of controller A 20 will stop running. The period of time that main processor 22 waits from the time it stops sending messages to AIU 50 until it stops running ensures that communication processor 24 has completed sending all messages to AIU 50 before main processor 22 stops running. Main processor 32 of controller B 30 detects the stoppage of main processor 22 via a WAKEUP signal on conductor 40 and starts to run. In accordance with the present invention, main processor 32 will wait for a specified period of time before initiating any communications with AIU 50. This period of time is predetermined and may be based on the time delays inherent in the system for signals to pass from main controller 12 to AIU 50. The delay by main processor 32 allows for the receipt by AIU 50 of any messages in progress being sent out of communication processor 24. Additionally, AIU 50 will complete its current message, if any, to communication processor 24 before switching the sending of any subsequent messages to communication processor 34.

After main processor 32 has waited for the specified time interval, main processor 32 will read buffer 26 via update bus 28 and 38 to retrieve any unprocessed messages that may have arrived from AIU 50 just before or during the switch from controller A 20 to controller B 30.

Thus, in accordance with the present invention, the delays by main processors 22, 32 prevent any messages between main controller 12 and AIU 50 from being lost during the switch from controller A 20 to controller B 30.

Figure 2:
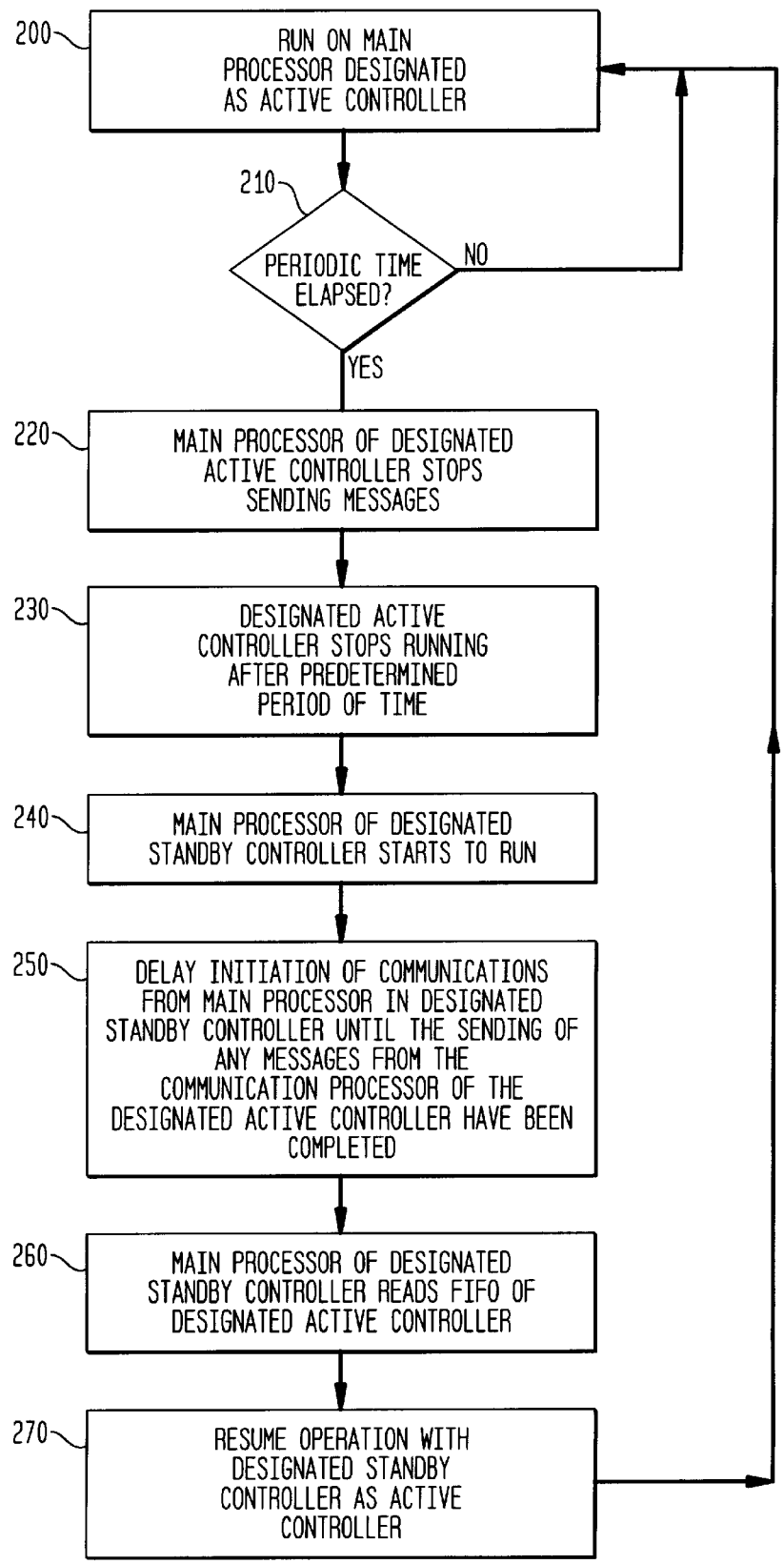
FIG. 2 illustrates in flow chart form the method according to the present invention.

FIG. 2 illustrates in flow chart form the method according to the present invention. In step 200, the system 10 is controlled by the controller A 20 which is designated as the active controller. In step 210, it is determined if the main processor 22 of active controller A 20 has been running for a predetermined period of time. The period of time is typically based on the relative life of a controller to provide for frequent switches during the life of a controller, and may be, for example, twenty-four hours. If the main processor 22 in designated active controller A 20 has not been running for the predetermined period of time (a NO response in step 210), the main processor 22 continues running and the system 10 is controlled by active controller A 20.

If it is determined that the main processor 22 of designated active controller A 20 has been running for the predetermined period of time (a YES response in step 210), the designated active controller A 20 will be switched in the following manner with the designated standby controller B 30 to prevent any potential loss of customer services. In step 220, the main processor 22 of designated active controller A 20 stops sending messages to AIU 50. After a predetermined time period has elapsed, the main processor 22 of designated active controller A 20 stops running in step 230. The time period for the delay between steps 220 and 230 may correspond to the time required for communication processor 24 to send any messages to AIU 50 in accordance with instructions from main processor 22. Thus, before the main processor 22 will stop operating, any messages received by main processor 22 via conductor 70 will have been placed in buffer 26 and retrieved and output by communication processor 24.

In step 240, main processor 32 of designated standby controller B 30 detects the stop of main processor 22 in designated active controller A 20 and starts to run. In accordance with the present invention, main processor 32 will wait for a predetermined period of time in step 250 before initiating any communications with AIU 50. The time period for the delay may correspond to the time required for any messages that may have been sent from communication processor 24 to be completed, i.e., received by AIU 50. Thus, before the main processor 32 will initiate any new communications with AIU 50, any messages from controller 12 to AIU 50 in progress during the change from designated active controller A 20 to designated standby controller B 30 will have completed being sent and have already been received by AIU 50.

After the specified period of time has elapsed in step 250, the main processor 32 of the designated standby controller B 30, which has started to run in step 240, will read in step 260 the buffer 26 of controller A 20 via the update bus 38 and 28 to retrieve any unprocessed messages that may have arrived from AIU 50 just before or during the switch from controller A 20 to controller B 30. In step 270, the system 10 resumes normal operation, with previously designated standby controller B 30 assuming the responsibilities of an active controller. The method then returns to step 200, with controller B 30 now designated as the active controller and controller A 20 designated as the standby controller.

By utilizing the method of the present invention, the switching from controller A 20 to controller B 30 and vice-versa is performed without the need to retransmit any messages that may have been in progress between AIU 50 and main controller 12 during the switch or without the risk of any messages being lost.

Reference has been made to a preferred embodiment in describing the invention. However, additions, deletions, substitutions, or other modifications which would fall within the scope of the invention defined in the claims may be implemented by those skilled in the art and familiar with the disclosure of the invention without departing from the spirit or scope of the invention. Also, although the invention is preferably implemented in software with programmed processors and controllers, it may be implemented in hardware, software, or any combination of the two. All are deemed equivalent with respect to the operation of the invention. Accordingly, the invention is not to be considered as limited by the foregoing description, but is only limited by the scope of the appended claims.

What is claimed as new and desired to be protected by Letters Patent of the United States is:

1. A network access system comprising:
    a main controller for controlling communications between said network and at least one customer device, said main controller comprising a first controller and a second controller, one of said first and second controllers being an active controller and the other of said controllers being a standby controller, only one of said active controller and said standby controller running at any given time, said active controller stopping operation after a predetermined period of time; and at least one access interface unit connected between said main controller and said at least one customer device, said at least one access interface unit sending messages to and receiving messages from said active controller of said main controller, wherein if said active controller stops operation before or at said predetermined period of time, a control signal is sent from said active controller to said standby controller, said standby controller starting to run in response to said control signal, and said main controller switches control from said active controller to said standby controller without requiring a retransmission of any of said messages sent between said at least one access interface unit and said active controller.

2. The network access system according to claim 1, wherein said active controller stops sending messages to said at least one access interface unit before stopping operation.

3. The network access system according to claim 2, wherein said standby controller delays initiation of communication with said at least one access interface unit for a predetermined amount of time after said standby controller begins to run.

4. The network access system according to claim 3, wherein said first controller further comprises:
    a first processor, said first processor controlling operation of said first controller.

5. The network access system according to claim 4, wherein said first controller further comprises:
    a second processor connected to said at least one access interface unit, said second processor sending messages to and receiving messages from said at least one access interface unit.

6. The network access system according to claim 5, wherein said first controller further comprises:
    a first storage buffer connected to said first processor and said second processor, said first processor and said second processor placing messages in and retrieving messages from said first storage buffer.

7. The network access system according to claim 6, wherein said second controller further comprises:
    a third processor, said third processor controlling operation of said second controller.

8. The network access system according to claim 7, wherein said second controller further comprises:
    a fourth processor connected to said at least one access interface unit, said fourth processor sending messages to and receiving messages from said at least one access interface unit.

9. The network access system according to claim 8, wherein said second controller further comprises:
    a second storage buffer connected to said third processor and said fourth processor, said third processor and said fourth processor placing messages in and retrieving messages from said second storage buffer.

10. The network access system according to claim 9, wherein said main processor further comprises:

an update bus connected between said first storage buffer and said third processor, wherein said third processor can retrieve messages stored in said first storage buffer.

11. The network access system according to claim 10, wherein said at least one access interface unit further comprises:

an interface processor, said interface processor connected to said second and said fourth processor to send messages to said second and said fourth processor.

12. The network access system according to claim 11, wherein said at least one access interface unit further comprises:

a first and second selection circuit connected to said second and said fourth processors and said interface processor, said first selection circuit selecting whether messages will be received and read by said interface processor from said second processor or said fourth processor, said second selection circuit selecting whether messages will be sent by said interface processor to said second processor or said fourth processor.

13. The network access system according to claim 10, wherein only one of said first and third processors is running at any given time.

14. The network access system according to claim 13, wherein said control signal is sent from said first processor to said third processor if said first processor ceases operation, said third processor starting to run in response to said control signal.

15. The network access system according to claim 14, wherein said first processor stops sending messages to said at least one access interface unit before sending said control signal to said third processor.

16. The network access system according to claim 15, wherein said third processor delays initiation of communication with said at least one access interface unit for a predetermined amount of time after said third processor begins to run.

17. The network access system according to claim 1, wherein said network is a digital network.

18. The network access system according to claim 1, wherein said at least one customer device includes a telephone device.

19. A digital network access system comprising:

a main controller for controlling communications between said digital network and at least one customer device, said main controller comprising an active controller and a standby controller;

at least one access interface unit connected between said main controller and said at least one customer device, said at least one access interface unit sending messages to and receiving messages from said active controller of said main controller;

each of said active and standby controllers further comprising:

a first processor for controlling operation of said active and standby controllers respectively, only one of said first processors of said active and standby controllers running at any given time;

a second processor connected to said at least one access interface unit, each of said second processors sending messages to and receiving messages from said at least one access interface unit; and a storage buffer connected to said first processor and said second processor, said first processor and said second processor of said active controller placing messages in and retrieving messages from said storage buffer of said active controller, said first processor and said second processor of said standby controller placing messages in and retrieving messages from said storage buffer of said standby controller, said first processor of said standby controller retrieving messages from said storage buffer of said active controller;

wherein if said active controller of said first processor stops operation, said first processor of said active controller stops sending messages to said at least one access interface unit and sends a control signal to said first processor of said standby controller, said first processor of said standby controller starting to run in response to said control signal, and said main controller switches control from said active controller to said standby controller without requiring a retransmission of any of said messages between said at least one access interface unit and said active controller.

20. The digital network access system according to claim 15, wherein said first processor of said standby controller delays initiation of communications with said at least one access interface unit for a predetermined amount of time after said first processor of said standby controller starts to run.

21. The digital network access system according to claim 20, wherein said at least one access interface unit further comprises:

a first and second selection circuit connected to said second processors of each of said active and standby controllers, said first selection circuit selecting whether messages will be received by said at least one access interface unit from said second processor of said active controller or said standby controller, said second selection circuit selecting whether messages will be sent by said at least one access interface unit to said second processor of said active controller or said standby controller.

22. The digital network access system according to claim 21, wherein said at least one customer device includes a telephone device.

23. A method for switching control from a first running controller to a second standby controller in a redundant network access interface device, each of said first and second controllers including a main processor which controls operation of each respective controller, said method comprising the steps of:

determining when said first controller stops running;

stopping said main processor of said first controller from sending any new messages;

sending a control signal from said main processor of said first controller to said main processor of said second controller;

delaying initiation of communications by said second controller for a predetermined amount of time; and operating said second controller to read unprocessed messages received by said first controller.

24. The method according to claim 23, further comprising:

starting said main processor of said second controller in response to said control signal.

25. The method according to claim 24, further comprising:

completing the sending of messages from said first controller during said delay by said second controller.

26. The method according to claim 25, wherein said operating step further comprises:

storing messages received by said first controller in a storage buffer in said first controller.

27. The method according to claim 26, further comprising:

reading said messages stored in said storage buffer of said first controller by said main processor of said second controller via a bus line.

28. The method according to claim 27, further comprising:

processing said messages read by said main processor in said second controller from said storage buffer in said first controller.

29. The method according to claim 23, wherein said network is a digital network.

\* \* \* \* \*